US006228329B1

(12) United States Patent
Garvey

(10) Patent No.: US 6,228,329 B1
(45) Date of Patent: *May 8, 2001

(54) TWO CHAMBER REGENERATIVE THERMAL OR CATALYTIC OXIDIZER WITH PURGING CIRCUIT

(75) Inventor: Richard Garvey, Northville, MI (US)

(73) Assignee: Durr Environmental, Wixom, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 08/206,873

(22) Filed: Mar. 4, 1994

(51) Int. Cl.[7] .......... B01D 50/00

(52) U.S. Cl. .......... 422/178; 422/171; 422/172; 422/173; 422/175

(58) Field of Search .......... 422/169, 170, 422/171, 172, 178, 190, 191, 193, 195, 175; 432/180, 181, 182

(56) References Cited

U.S. PATENT DOCUMENTS 5,101,741 * 4/1992 Gross et al. .......... 422/175 X
5,129,332 * 7/1992 Greco .......... 432/181 X
5,163,829 * 11/1992 Wildenberg .......... 422/175 X
5,184,951 * 2/1993 Nutcher et al. .......... 432/181 X
5,229,077 * 7/1993 Bell et al. .......... 422/168
5,259,757 * 11/1993 Plejdrup et al. .......... 432/181
5,352,115 * 10/1994 Klobucar .......... 432/181

* cited by examiner

*Primary Examiner*—Hien Tran
(74) *Attorney, Agent, or Firm*—Howard & Howard

(57) ABSTRACT

A two chamber regenerative thermal oxidizer comprises an oxidizing chamber and a pair of regenerator chambers. Inlet and outlet valves control fluid flow to and from said regenerator chambers. A transition duct communicates with a contaminated fluid feed duct upstream of the regenerator inlet valves and with the oxidizing chamber of said oxidizer. A purge air duct directs the output of the regenerator chambers back to the chambers, selectively. Electronic control means effects powered actuation of said valves, selectively, in a prearranged sequence whereby the inlet and outlet valves in the respective regenerators are never open at the same time thereby precluding short circuiting of the regenerative chamber, yet all of the inlet and outlet valves to the regenerative chambers are never simultaneously closed thereby to maintain the pressure of fluid flow through said regenerator chambers relatively constant.

1 Claim, 3 Drawing Sheets

TWO CHAMBER REGENERATIVE THERMAL OR CATALYTIC OXIDIZER WITH PURGING CIRCUIT

BACKGROUND OF THE INVENTION

This invention relates generally to the abatement of contaminant laden industrial process emissions and more specifically, to a ducting, valving and purging system that directs and controls the flow of such emissions to and through a two chamber regenerative oxidizer.

Industrial process emissions often contain combustible contaminants and/or odors that, if released to atmosphere, have the potential of polluting the environment. Thermal and/or catalytic oxidizers increase the temperature of such process emissions to a temperature above the ignition temperature of the contaminants therein so as to oxidize the contaminants. Characteristically, power actuated, computer controlled flow control valves, of the type disclosed in U.S. Pat. No. 5,000,422 or U.S. Pat. No. 5,327,928, both of which are assigned to the assignee of the present invention, are used to direct the emissions to one or more oxidizers.

One problem that materially effects the efficiency of such oxidizers is short circuiting of the oxidizer by contaminated emissions incident to opening and closing of the valves required for control of fluid flow to and from the regenerators. Obviously, short circuiting of emissions between flow control valves in the partially open condition seriously compromises the efficiency of the oxidizer.

Another problem relates to purging of the regenerative chambers without inducing wide pressure fluctuations. Purging of the regenerative chambers is required to remove nonoxidized source emissions from the open volumes within, for example, the ceramic media.

More specifically, as the regenerative chambers of known two chamber regenerative oxidizers switch from inflow to outflow, there is both a momentary change in system pressure due to simultaneous opening and closing of all valves, and a momentary period where incoming contaminant laden emissions short circuit the common oxidation chamber. Pressure variations place excessive loads on the fluid moving equipment and are unacceptable in processes being controlled via the regenerative oxidizer. Short circuiting of the oxidation chamber compromises efficiency of the system.

SUMMARY OF THE INVENTION

The aforesaid problems associated with known two chamber oxidizers is solved by a novel transition circuit and valving system operating in conjunction with a purging circuit. The transition circuit enables cycling of a two chamber regenerative oxidizer without process pressure variations and without compromise of control or oxidation efficiency. The transition circuit contains an orifice plate and trim damper that are utilized to match the fluid flow resistance of the regenerative chambers to the transition circuit. Pollutant-laden air is not allowed to short circuit the oxidation chamber yet system flow resistance is maintained constant by the transition circuit.

The regenerator media purging circuit is integrated with the oxidation system in a manner that complements cycling of the regenerative chambers in that the media purge system cleans, for example, a ceramic matrix of unoxidized fumes, prior to the regenerative chamber entering an outlet cycle.

More specifically, the transition circuit consists of a directly connected duct between the contaminated process emission inlet duct and the oxidizer combustion chamber.

The purge system consists of ductwork connecting the clean air discharge of the regenerative chambers, selectively, to the regenerative chambers.

DETAILED DESCRIPTION OF THE PREFERRED EMBODIMENT

Figure 1:
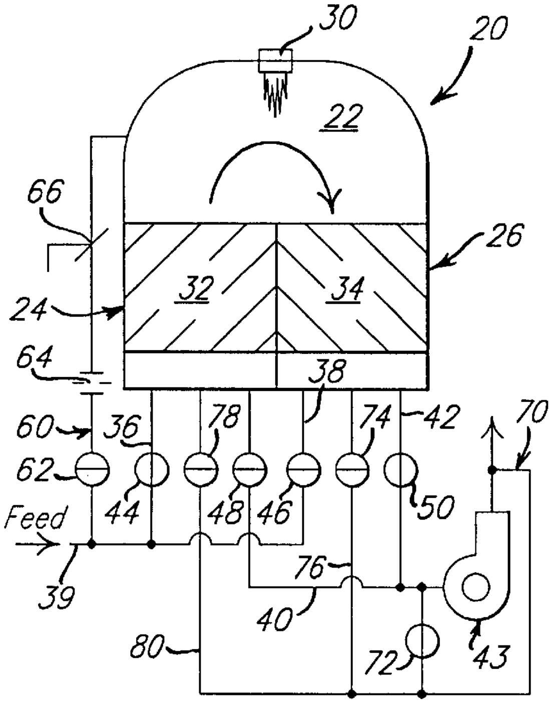
FIGS. 1–12 are similar diagrammatic representations of a two chamber regenerative thermal or catalytic oxidizer with an integrated purge system showing the sequence of valve operation.

As seen in FIGS. 1–12, a two chamber regenerative oxidizer 20 comprises a common combustion chamber 22 overlying a pair of segregated regenerative chambers 24 and 26. The combustion chamber 22 is provided with a conventional burner 30. The regenerative chambers 24 and 26 are provided with, for example, a ceramic matrix heat exchange media, for example, ceramic saddles 32 and 34, respectively.

A contaminated emission duct 39 feeds the regenerative chambers 24 and 26 of the oxidizer 20 through a pair of inlet ducts 36 and 38, respectively. Outlet ducts 40 and 42 lead from the beds 24 and 26, respectively to the low pressure side of an exhaust blower 43. The inlet ducts 36 and 38 are provided with valves 44 and 46, respectively, and the outlet ducts 40 and 42 are provided with valves 48 and 50, respectively, for control of flow to the exhaust blower 43.

A transition duct 60 extends from the contaminated emission feed duct 39 to the combustion chamber 22 of the oxidizer 20. The transition duct 60 is provided with a control valve 62, an orifice plate 64, and a trim damper 66, to control and balance flow of contaminated emissions to the oxidizer 20 at all operational modes thereof, as will be described.

In accordance with the present invention, the oxidizer 20 is provided with a purge circuit comprising a duct 70 leading from the clean air output of the exhaust blower 43. Flow through the duct 70 is short circuited back to the blower 43 upon opening of a balancing valve 72 that communicates with the inlet duct 40 to the exhaust blower 43.

The clean air duct 70 feeds the regenerative chamber 26 through a valve 74 and line 76 and feeds the regenerative chamber 24 through a valve 78 and duct 80.

In operation, and as seen in FIG. 1, contaminated emissions flow through feed duct 39, open valve 44, and duct 36 to regenerative chamber 24 wherein the emissions are preheated. The emissions then flow through the combustion chamber 22 thence outwardly of regenerative chamber 26, duct 42, and open valve 50 to the exhaust blower 43. The transition circuit control valve 62 is closed during the aforesaid first phase of operation. Purge air is circulated through duct 70, open valve 72, and duct 40 back to blower 43.

Figure 2:
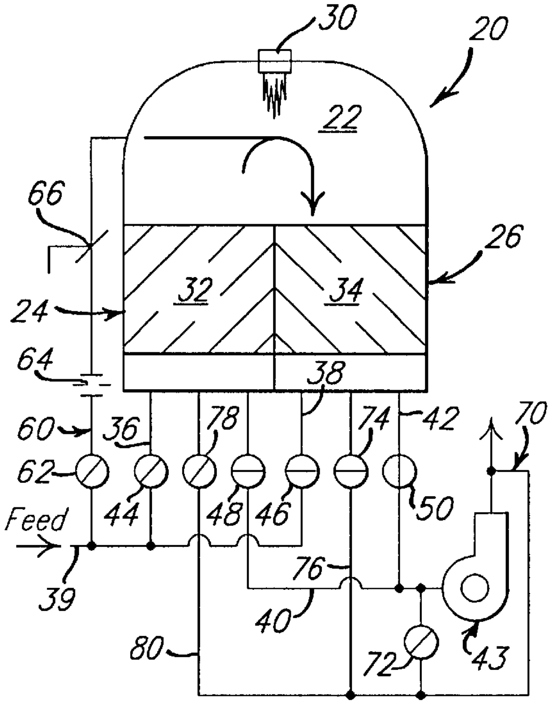

As seen in FIG. 2, inlet valve 44 begins to close and transition valve 62 beings to open. Thus, emission inlet flow is through both the transition duct 60 and regenerator inlet duct 36. Outlet flow continues through open valve 50 from regenerator 26. Purge valve 78 begins to open to regenerative chamber 24 and purge balancing valve 72 begins to close.

Figure 3:
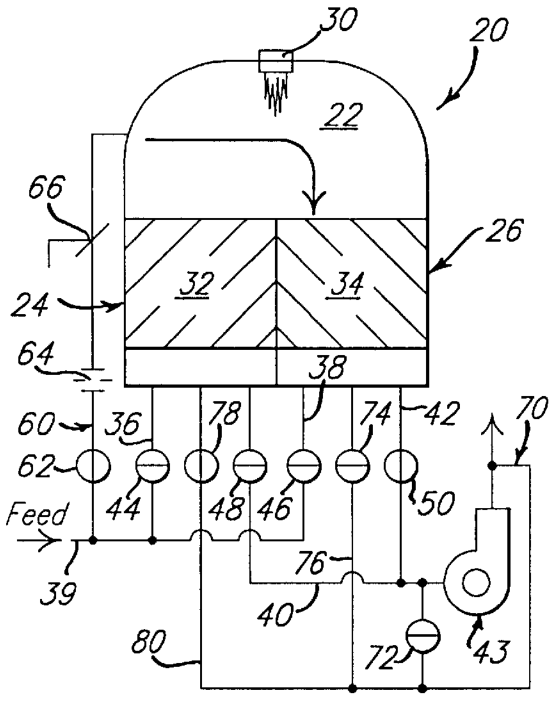

As seen in FIG. 3, regenerative bed 24 is in an idle condition with both the inlet valve 44 and the outlet valve 48 closed. Transition circuit valve 62 is fully open resulting in 100% of inlet emissions flow through the transition duct 60. Outlet flow remains through open outlet valve 50 from regenerator 26. Purge valve 78 to regenerative chamber 24 remains open thereby purging chamber 24. Purge balancing valve 72 is closed.

Figure 4:
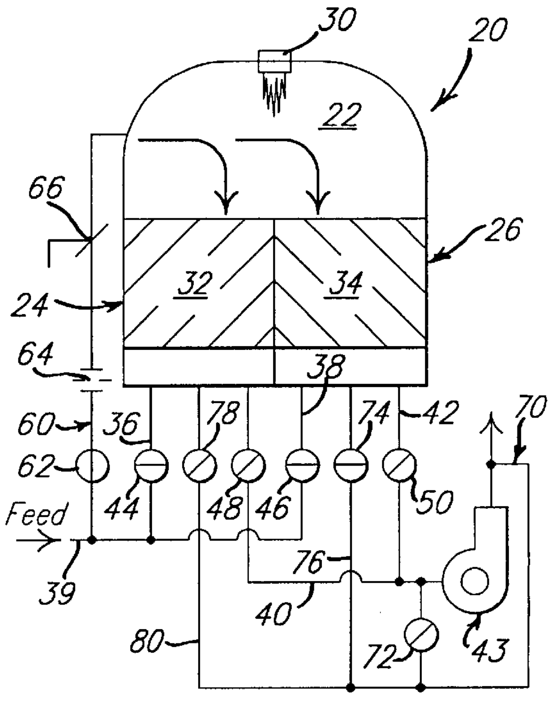

As seen in FIG. 4, the inlet valve 44 to the regenerator 24 remains closed and outlet valve 48 begins to open. Simultaneously, outlet valve 50 from regenerator 26 begins to close. Inlet emission flow remains through open valve 62 and the transition circuit 60. Outlet flow is through partially open valves 48 and 50 from the regenerators 24 and 26, respectively. Purge valve 78 to regenerative chamber 24 begins to close and balancing valve 72 begins to open.

Figure 5:
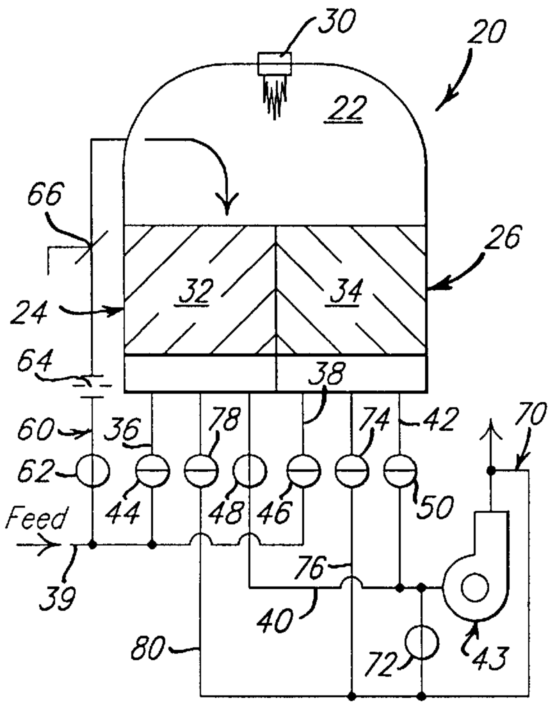

As seen in FIG. 5, regenerator 26 is in an idle position with both inlet valve 46 and outlet valve 50 closed. Emissions inlet flow is solely through valve 62 and the transition circuit 60. Outlet flow is solely through fully open valve 48 from regenerator 24. Purge air is circulating through open balancing valve 72.

Figure 6:
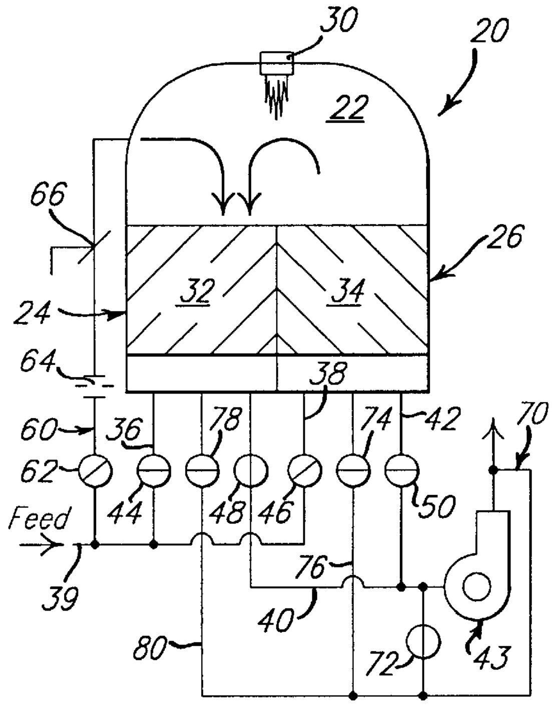

As seen in FIG. 6, outlet valve 50 from regenerator 26 remains closed, while inlet valve 46 begins to open and transition circuit valve 62 begins to close. Emission inlet flow is through both the transition circuit 60 to regenerator 24 and through valve 46 to regenerator 26. Outlet flow from regenerator 24 is through open valve 48. Purge air circulates through the open balancing valve 72.

Figure 7:
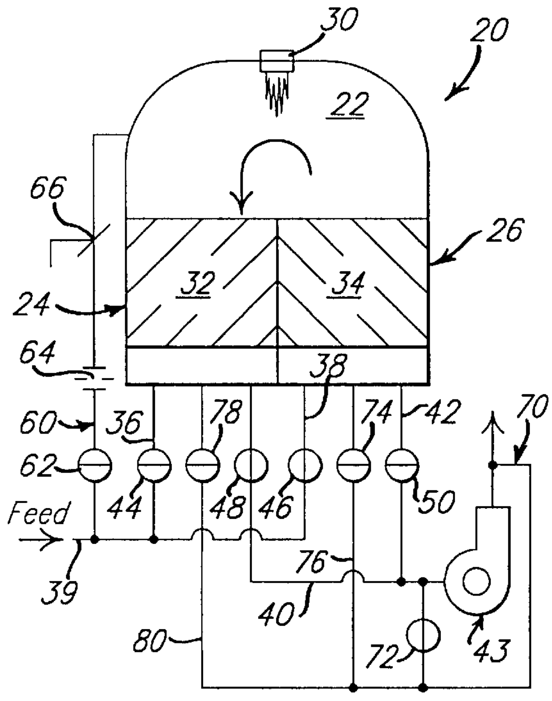

As seen in FIG. 7, transition circuit valve 62 and therefore the transition circuit 60 is closed. Emission inlet flow is through open valve 46 to regenerator 26. Outlet flow is through valve 48 from regenerator 24. Purge air is circulating through open valve 72.

Figure 8:
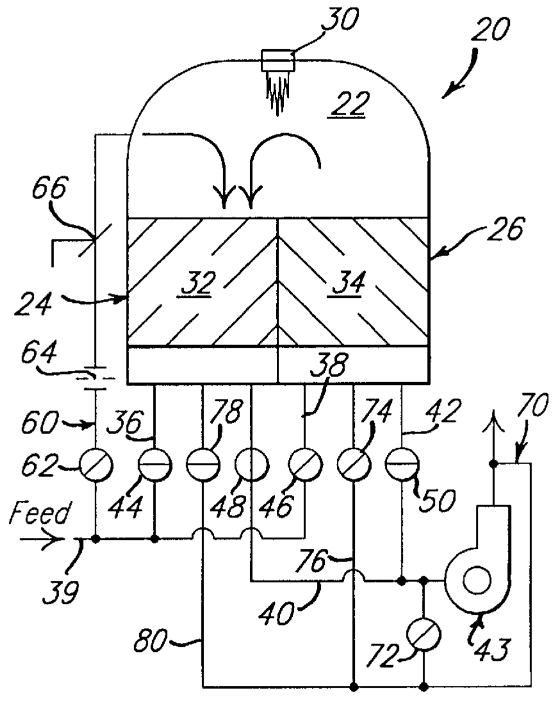

As seen in FIG. 8, the inlet valve 46 to regenerator 26 begins to close and transition circuit valve 62 begins to open. Outlet flow is through valve 48 from regenerator 24. Emission inlet flow is shared between the transition circuit 60 and valve 46 to regenerator 26. Balancing valve 72 begins to close off recirculation of purge air and purge air valve 74 begins to open to admit air to regenerative chamber 26.

Figure 9:
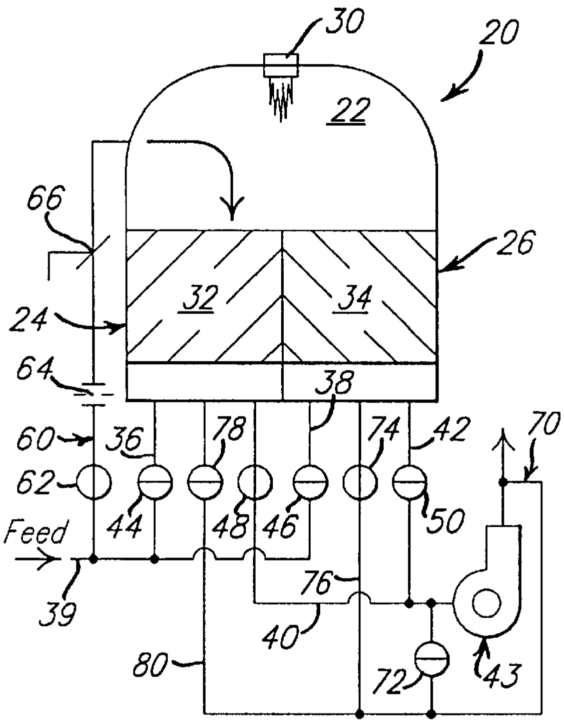

As seen in FIG. 9, regenerator 26 is in an idle position with both the inlet valve 46 and the outlet valve 50 closed. Inlet emission flow is solely through the transition circuit valve 62 and transition circuit 60. Outlet flow is through valve 48 from regenerator 24. Purge valve 74 to regenerator chamber 26 is open and said chamber is being purged.

Figure 10:
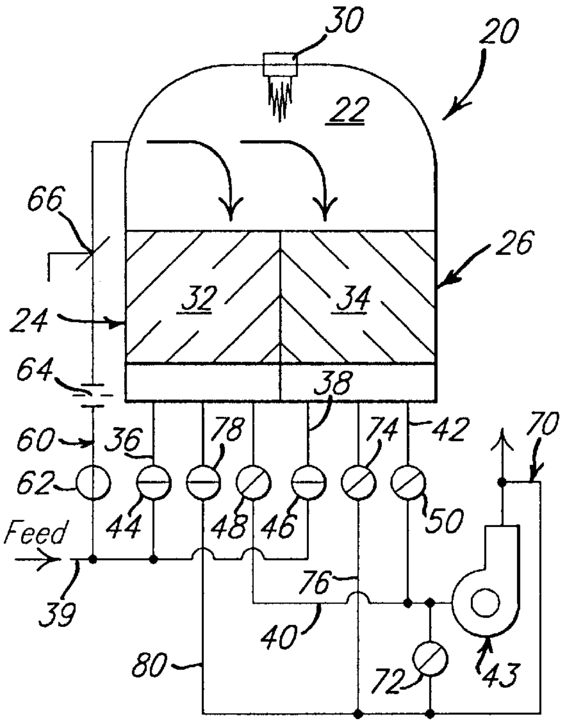

As seen in FIG. 10, the inlet valve 46 to regenerator 26 is closed and outlet valve 50 therefrom begins to open. Regenerator 24 outlet valve 48 begins to close. Emission inlet flow is solely through valve 62 and the transition circuit 60. Outlet flow is shared between valves 48 and 50 from regenerators 24 and 26, respectively. Purge valve 74 to regenerative chamber 26 is closing and balance valve 72 is opening.

Figure 11:
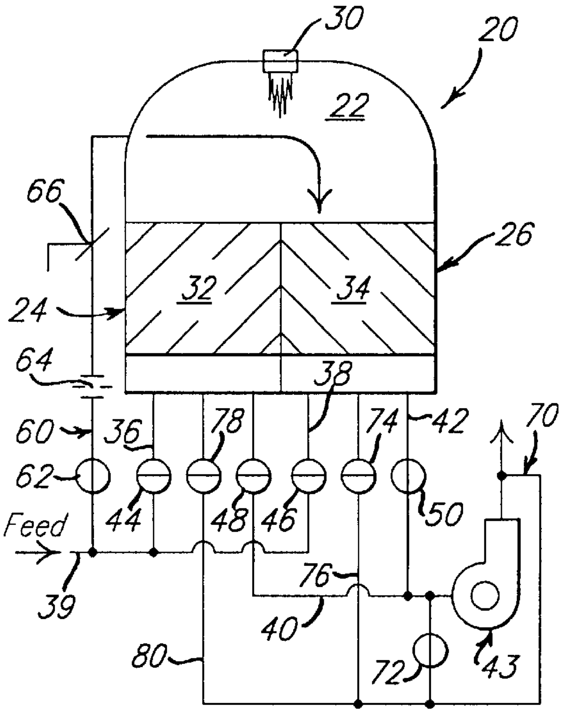

As seen in FIG. 11, regenerator 24 is in an idle position with both the inlet valve 44 and the outlet valve 48 closed. Emission inlet flow is solely through valve 62 and the transition circuit 60. Outlet flow is solely through valve 50 from regenerator 26. Purge air circulates through open balancing valve 72.

Figure 12:
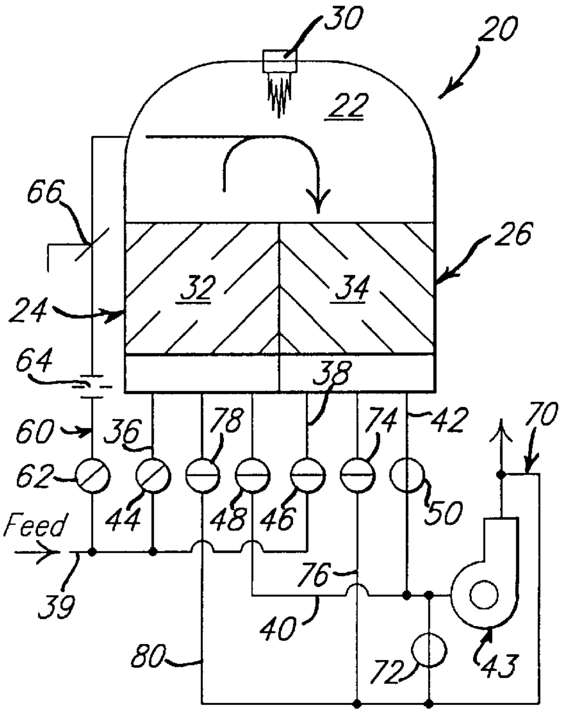

As seen in FIG. 12, the outlet valve 48 from regenerator 24 is closed and the inlet valve 44 thereto begins to open. The transition circuit valve 62 in the transition circuit 60 begins to close conditioning the system 20 for operation as discussed with respect to FIG. 1. Purge air circulates through open balancing valve 72.

From the foregoing it should be apparent that the transition circuit 60 results in an operating circuit and sequence that precludes contaminated emissions from short circuiting the oxidation chamber 22 of the oxidizer 20. Static pressure variations are minimized by the orifice plate 64 and trim damper 66 in the transition circuit 60. Purging of the regenerators 24 and 26 is accomplished in a manner that improves efficiency without compromising flow pressure uniformity.

While the preferred embodiment of the invention has been disclosed, it should be appreciated that the invention is susceptible of modification without departing from the scope of the following claims.

I claim:

1. A two chamber regenerative thermal oxidizer comprising:

a contaminated fluid feed duct;

an oxidizing chamber;

a pair of regenerator chambers each having one side communicating with said oxidizing chamber;

a pair of regenerator chamber feed ducts extending solely and directly between an opposite side of said regenerator chambers, respectively, and said contaminated fluid feed duct;

a pair of inlet valves disposed in said regenerator chamber feed ducts for controlling contaminated fluid flow to said regenerator chambers, respectively;

a pair of outlet ducts extending solely and directly between the opposite side of said regenerator chambers, respectively, and a low pressure side of an exhaust blower;

a pair of outlet valves in said outlet ducts, respectively;

a purge air duct extending directly between the high pressure side of said blower and a pair of purge air inlet ducts connected directly with the opposite sides of said regenerative chambers, respectively;

a pair of purge air control valves in said purge air inlet ducts for controlling the flow of purge air to said regenerator chambers, respectively;

a transition duct separate from said purge air duct extending solely and directly between said contaminated fluid feed duct upstream of said inlet valves and the oxidizing chamber of the regenerative thermal oxidizer;

a valve in said transition duct for controlling flow therethrough;

an orifice plate in said transition duct for controlling the pressure of contaminated fluid flow therethrough;

a damper in said transition duct for balancing contaminated fluid pressure between said feed duct and the low pressure side of said exhaust blower; and control means for opening and closing said valves, selectively, in a prearranged sequence whereby either the transition duct valve or one of the inlet valves in said regenerator chamber feed ducts and one of said outlet valves is open at all times to maintain the pressure of fluid flow through the regenerative thermal oxidizer relatively constant.

* * * * *